United States Patent
Lyu et al.

(10) Patent No.: US 12,473,172 B2
(45) Date of Patent: Nov. 18, 2025

(54) PROCESSING EQUIPMENT AND ITS SUPPORTING STRUCTURE

(71) Applicant: Industrial Technology Research Institute, Hsinchu (TW)

(72) Inventors: You-Syun Lyu, Hsinchu (TW); Jia-Jyun Shen, Hsinchu (TW); Yung-Chi Chang, Hsinchu (TW)

(73) Assignee: INDUSTRIAL TECHNOLOGY RESEARCH INSTITUTE, Hsinchu (TW)

( * ) Notice: Subject to any disclaimer, the term of this patent is extended or adjusted under 35 U.S.C. 154(b) by 400 days.

(21) Appl. No.: 18/059,263

(22) Filed: Nov. 28, 2022

(65) Prior Publication Data
US 2024/0174477 A1    May 30, 2024

(51) Int. Cl.
| | | |
|---|---|---|
| *B65H 54/00* | (2006.01) | |
| *B29C 70/32* | (2006.01) | |
| *B65H 54/28* | (2006.01) | |
| *F16C 3/02* | (2006.01) | |
| *B29K 307/04* | (2006.01) | |
| *B29L 31/00* | (2006.01) | |

(52) U.S. Cl.
CPC ......... *B65H 54/2896* (2013.01); *B29C 70/32* (2013.01); *F16C 3/02* (2013.01); *B29K 2307/04* (2013.01); *B29L 2031/75* (2013.01); *F16C 2208/02* (2013.01); *F16C 2208/04* (2013.01); *F16C 2220/28* (2013.01); *F16C 2326/06* (2013.01)

(58) Field of Classification Search
CPC ....... B65H 54/2896; B29C 70/32; F16C 3/02; F16C 2220/28; F16C 2326/06
See application file for complete search history.

(56) References Cited

U.S. PATENT DOCUMENTS

| | | | | |
|---|---|---|---|---|
| 539,473 | A * | 5/1895 | Finigan | B65H 54/2896 475/14 |
| 5,104,053 | A * | 4/1992 | Bradshaw | B65H 55/02 242/175 |
| 5,203,249 | A | 4/1993 | Adams et al. | |
| 5,725,167 | A * | 3/1998 | Garwood | B65H 54/28 242/478.5 |
| 10,961,080 | B1 * | 3/2021 | Young | B65H 75/4405 |
| 2022/0119997 | A1 | 4/2022 | Steinhilber | |

FOREIGN PATENT DOCUMENTS

| | | |
|---|---|---|
| CN | 102362023 A | 2/2012 |
| CN | 103386692 A | 11/2013 |

(Continued)

OTHER PUBLICATIONS

Office Action issued in Taiwan Application No. 11320343360, dated Apr. 9, 2024, 10 pages.

(Continued)

*Primary Examiner* — Emmanuel M Marcelo
(74) *Attorney, Agent, or Firm* — HSML P.C.

(57) ABSTRACT

A processing equipment is provided, in which a carrier structure with at least one guide pin is arranged in a ring center area of a ring body of a frame, and a wire-supply device disposed on the ring body can supply wires to the center structure, so the wires can be woven around the guide pin and formed on the carrier structure so that the wire covers the carrier structure to form an exposed area around the guide pin.

10 Claims, 8 Drawing Sheets

(56) References Cited

FOREIGN PATENT DOCUMENTS

| | | | |
|---|---|---|---|
| CN | 105729831 A | 7/2016 | |
| CN | 110424097 A | 11/2019 | |
| CN | 110936514 A | 3/2020 | |
| CN | 114180394 A | 3/2022 | |
| DE | 102010049563 A1 | 4/2012 | |
| DE | 102011085962 A1 | 5/2013 | |
| EP | 0668446 A1 | 8/1995 | |
| WO | 2006027476 A1 | 3/2006 | |

OTHER PUBLICATIONS

Alemour, et al., A Review of Using Conductive Composite Materials in Solving Lightening Strike and Ice Accumulation Problems in Aviation, J Aerosp Technol Manag, 11:e1919. htttps://doi.org/10.5028/jatm.v11.1022, 23 pages.

Nguyen, Loading, support and geometry effects for pin-reinforced hybrid metal-composite joints, Composites: Part A 98 (2017) 192-206, 15 pages.

Sun, Experimental and numerical studies on the braiding of carbon fibres over structured end-fittings for the design and manufacture of high performance hybrid shafts, Production Engineering, https://doi.org/10.1007/s11740-018-0824-1, 14 pages.

Daniel, Mechanical and Failure Characterization of Textile Composites, 16th International Conference on Composite Materials, 6 pages.

Ferreira, Multifunctional Material Systems: A state-of-the-art review, Composite Structures 151 (2016) 3-35, 33 pages.

Daniel, Three-dimensional characterization of textile composites, ScienceDiet Composites: Part B 39 (2008) 13-19, 7 pages.

* cited by examiner

PROCESSING EQUIPMENT AND ITS SUPPORTING STRUCTURE

BACKGROUND

1. Technical Field

The present disclosure relates to a processing equipment and a carrier structure thereof, and more particularly, to a processing equipment and a carrier structure thereof adapted to woven wire-supply.

2. Description of Related Art

Recently, the torque requirements of vehicle transmission shafts have increased. Thus the structural strengths of the vehicle transmission shafts has also needed to be improved to avoid damage during use.

Conventional vehicle transmission shafts usually attach carbon fiber cloth onto the shafts, or cover carbon fiber cloth on the shafts in a mechanical method such as bolting, so as to strengthen the structural strengths of the vehicle transmission shafts.

However, the heat resistance of existing adhesive material is poor. The upper limit thereof is about 200° C., such that the carbon fiber cloth is prone to peel off from the bonding interface. Hence, if the bonding method is adopted, the structural strength of the vehicle transmission shaft will depend on the viscosity of the adhesive material instead of the carbon fiber cloth, which often occurring problems such as strength failure and lifetime reduction of the adhesive material at high temperatures, resulting in the coating failure of the carbon fiber cloth.

Moreover, if the bolting method is adopted, then the structural strength of the vehicle transmission shaft will depend on the carbon fiber cloth. The carbon fiber cloth needs to be drilled to form holes for the bolts to pass through, thus fibers of partial regions of the carbon fiber cloth will be damaged. So, the strength of the carbon fiber cloth will decrease resulting in difficulties for the vehicle transmission shaft to withstand larger torque transmission during use, and even producing poor reliability problems such as occurring cracks at the holes due to the stress concentration.

Therefore, how to overcome the aforementioned drawbacks of prior art has become an urgent issue to be addressed at present.

SUMMARY

In view of the various shortcomings of the prior art, the present disclosure provides a carrier structure, adapted to woven wire-supply, the carrier structure comprises: a carrier body: and at least a guide pin, disposed on the surface of the carrier body, so wires are woven around the at least a guide pin and covered on the carrier body: wherein the at least a guide pin rotates relative to the carrier body.

The present disclosure also provides a processing equipment, comprising: a frame, having a ring body: and a carrier structure, having a carrier body and at least a guide pin, the at least a guide pin is disposed of on the surface of the carrier body, so wires be woven around the at least a guide pin and covered on the carrier body, and the carrier structure is correspondingly disposed in a ring center area of the ring body, so that the at least a guide pin of the carrier body rotates relative to the carrier body; and a plurality of wire supply devices, disposed on the ring body in a displaceable manner, and the wires are gathered by winding, so the wires are supplied to the carrier structure from the plurality of wire supply devices, so that the wires match the movements of the plurality of the wire supply devices to be woven on the carrier structure.

DETAILED DESCRIPTIONS

Figure 1A:
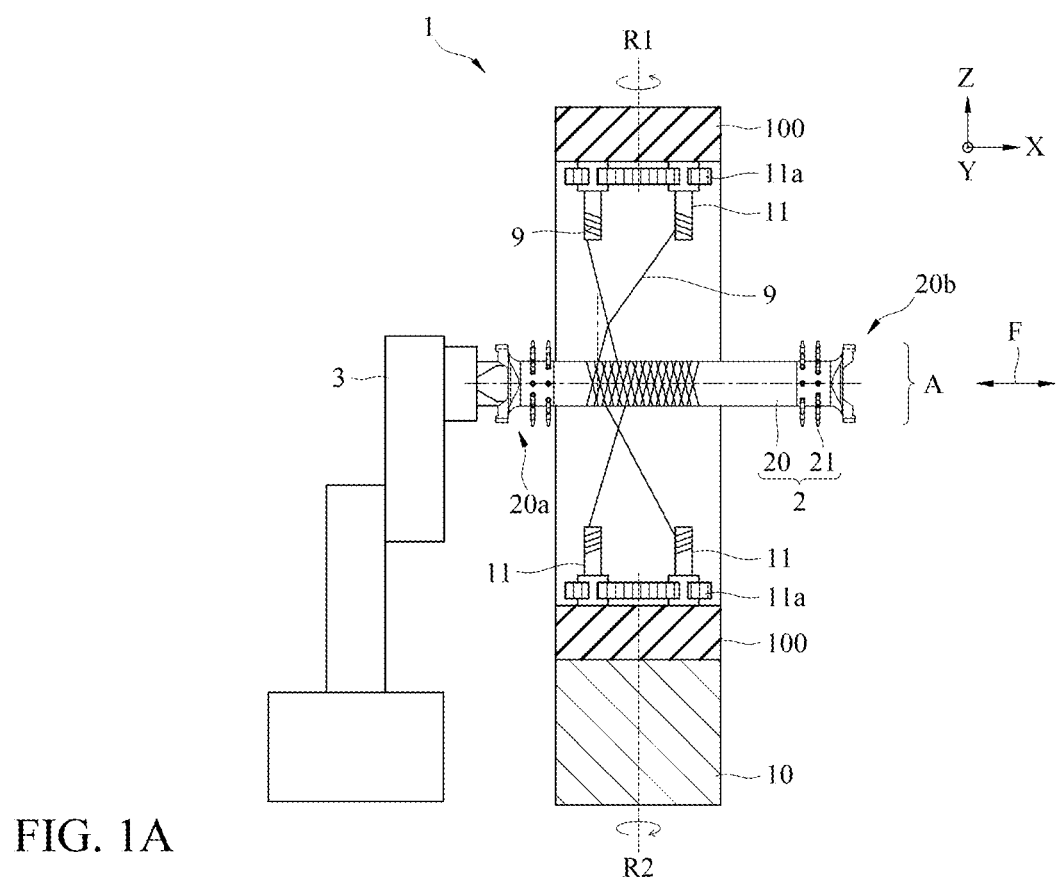
FIG. 1A is a schematic side cross-sectional view of a processing equipment in the present disclosure.

The following describes the implementation of the present disclosure with examples. Those familiar with the art can easily understand the other advantages and effects of the present disclosure from the content disclosed in this specification.

It should be noted that the structures, ratios, sizes, etc. shown in the drawings appended to this specification are to be construed in conjunction with the disclosure of this specification in order to facilitate the understanding of those skilled in the art. They are not meant to limit the implementations of the present disclosure and therefore have no substantial technical meaning. Any modifications of the structures, changes of the ratio relationships, or adjustments of the sizes, are to be construed as falling within the range covered by the technical content disclosed herein to the extent of not causing changes in the technical effects created and the objectives achieved by the present disclosure. Meanwhile, terms such as "on," "a," and the like recited herein are for illustrative purposes and are not meant to limit the scope in which the present disclosure can be implemented. Any variations or modifications to their relative relationships, without changes in the substantial technical content, should also be regarded as within the scope in which the present disclosure can be implemented.

Figure 1B:
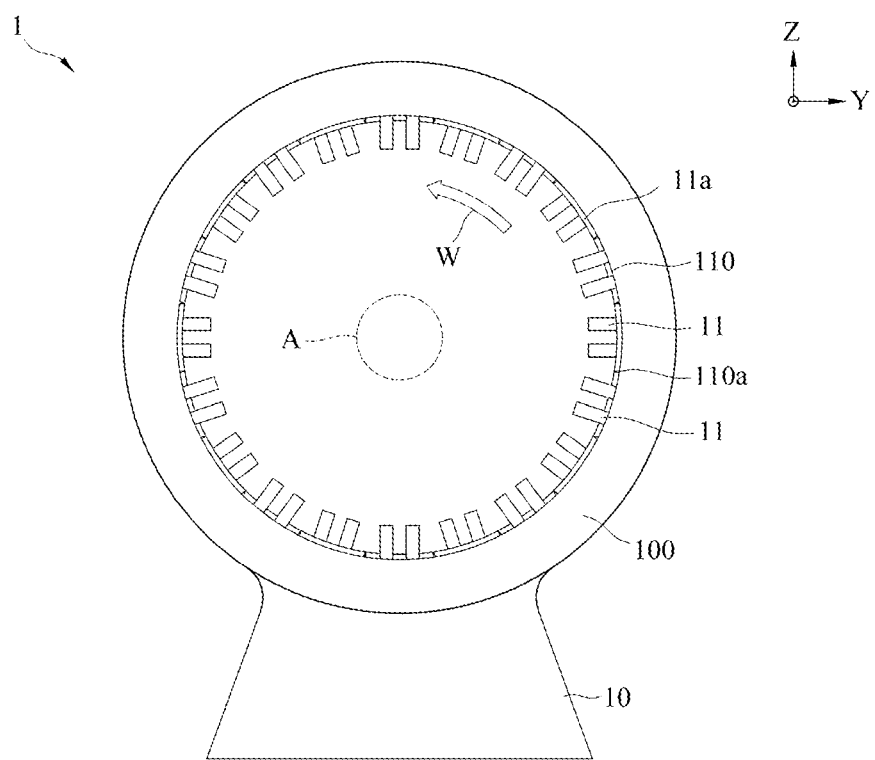
FIG. 1B is a schematic partial front planar view of a processing equipment in the present disclosure.

FIG. 1A and FIG. 1B are the schematic side and partial front view of processing equipment 1 of the present disclosure. The aforesaid processing equipment 1 comprises: a frame 10 with a ring body 100, a plurality of wire supply devices 11 disposed on the ring body 100 in a rotatable manner, and a carrier structure 2 disposed correspondingly to the wire supply devices 11.

In an embodiment, processing equipment 1 defines the height direction of frame 10 based on the environmental surface as an up and down direction (as arrow direction Z shown in FIG. 1A), defines the axis direction of the ring body 100 as a front and rear direction (as arrow direction X shown in FIG. 1A), and defines the direction of the ring surface of the ring body 100 perpendiculars to the height direction as a left and right direction (as arrow direction Y shown in FIG. 1B). It should be understood that the orientation is used to illustrate the configuration of the embodiments, but without special limitation.

The aforesaid 10 is disposed on the ground, and the ring body 100 is circular and defines a ring center area A.

As shown in FIG. 1B, in an embodiment, the ring center area A is an imaginary area divided by a specific radius based on the center of the aforementioned circular ring, the specific radius is smaller than the radius formed from the center to the ring body 100.

The aforesaid wire supply devices 11 is disposed on the ring body 100 in a displaceable manner, and wires 9 are gathered by winding, so the wires 9 are supplied to the carrier structure 2 from the wire supply devices 11, so that the wires 9 matches the movements of the wire supply devices 11 on the ring body 100 to be woven on the carrier structure 2.

Figure 1C:
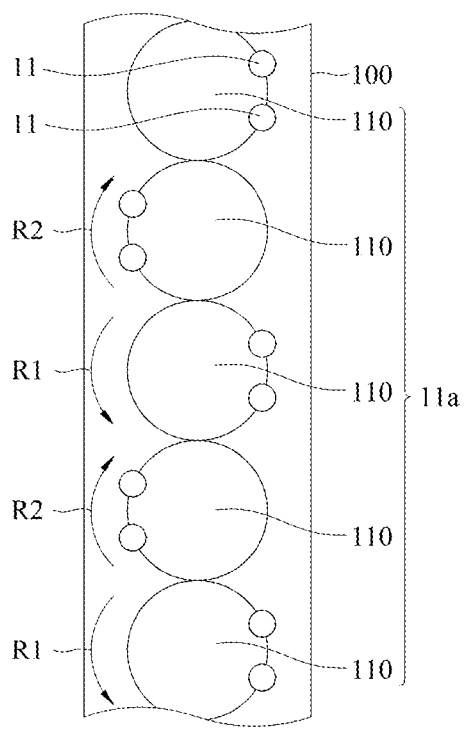
FIG. 1C is a schematic partial side view of a processing equipment in the present disclosure.

In an embodiment, the wire supply devices 11 include sticks or rods for winding and concentration of the wires 9, one side thereof towards the ring center area A, and the other side is engaged to a track structure 11a disposed on the ring body 100, so the wire supply devices 11 displace on the ring body 100 through the track structure 11a. As shown in FIG. 1C, the track structure 11a comprises a plurality of base bodies 110 arranged continuously along the ring body 100, and the plurality of base bodies 110 is disposed on the ring body 100 in a manner that can self-rotate relative to the ring body 100.

Besides, a gear structure (not shown) is disposed on an edge of the base body 110, so adjacent two of the plurality of base bodies 110 mesh with each other by the gear structure, so that each of the base bodies 110 can rotate synchronously relative to the ring body 100 at the same site. For instance, the self-rotation directions R1 and R2 of adjacent two base bodies 110 and relative to the ring body 100 are in opposite directions, as shown in FIG. 1C.

Therefore, when each of the base body 110 rotates, a transmission belt effect occurred, and the wire supply device 11 will displace from one base body 110 to another base body 110. So the wire supply device 11 moves relatively to the ring center area A along the ring body 100, as the anticlockwise (clockwise) revolution direction W shown in FIG. 1B. In other words, one base body 110 can transfer the wire supply device 11 thereon to another adjacent base body 110, so that the wire supply device 11 moves on the track structure 11a in a S-shaped path. For instance, in an embodiment, there might be two wire supply devices 11 existing on the single base body 110 at the same time, and the two wire supply devices 11 will not be located on the same diameter of the circular gear structure of the base body 110.

Furthermore, there are many kinds of the track structure 11a, so there are many ways for the wire supply device 11 to engage to the base body 110, such as a concave-convex structure, a snap-fit structure, or other methods that can transfer the wire supply device 11 from one base body 110 to the adjacent base body 110. Thus as long as the track structure 11a can have the wire supply device 11 moves along the ring body 100 that is without special limitation.

In addition, wire 9 is a composite material, such as carbon fiber, glass fiber, or other light and high-strength wire, to match the carrier structure 2 to manufacture the required products, such as transportation (such as vehicle shafts, frames, etc.), sports equipment (such as badminton rackets, hockey handles rafting paddles, etc.), industrial supplies (such as liquefied petroleum gas cylinders, hydrogen cylinders, oxygen cylinders, high-pressure pipes, etc.), or other products required other products require high strength.

Figure 2A:
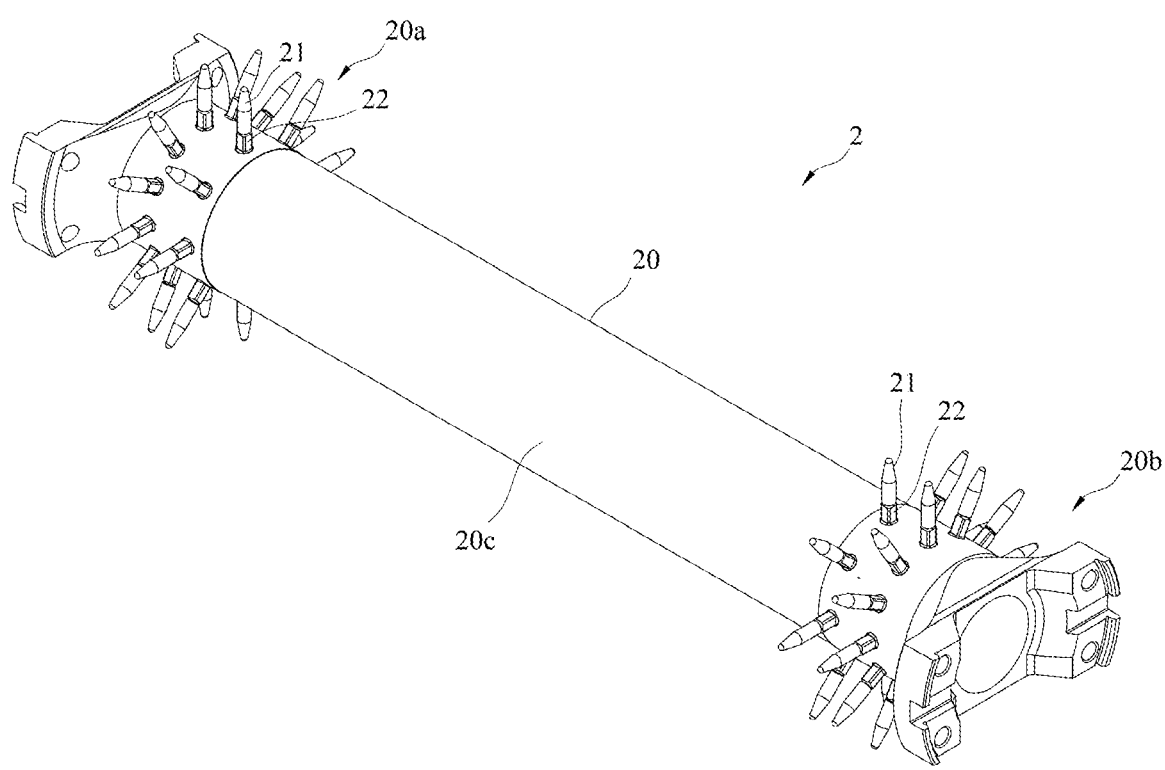
FIG. 2A is a schematic perspective view of a carrier structure in the present disclosure.
Figure 2B:
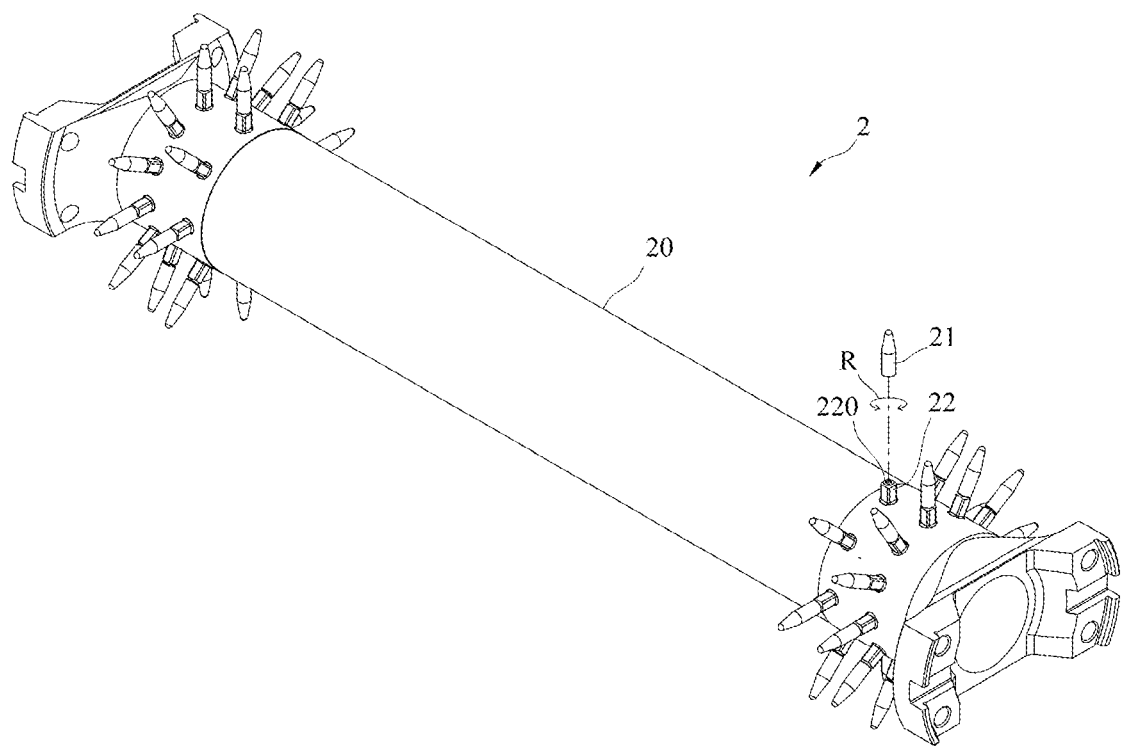
FIG. 2B is a schematic partial exploded view of FIG. 2A.
Figure 2C:
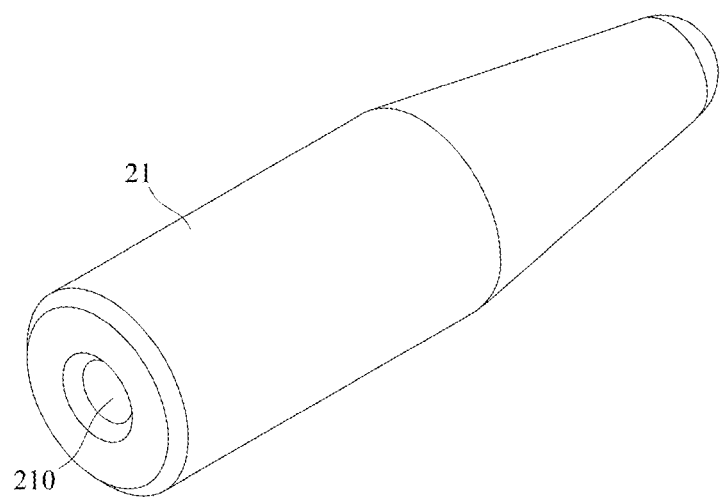
FIG. 2C is a schematic partial enlarged view of FIG. 2B.

Referring to FIG. 2A to FIG. 2C, the aforesaid carrier structure 2 is disposed correspondingly to the ring center area A of the ring body 100, so the wire supply device 11 can supply the wires 9 to the carrier structure 2 to cover the carrier structure 2, wherein the carrier structure 2 comprises a carrier body 20 and a plurality of guide pins 21 disposed on the carrier body 20, as shown in FIG. 2A, so that the guide pins 21 drive the wires 9 to cover the surface 20c of the carrier body 20. It should be understood that the way that wires 9 covers carrier structure 2 includes the winding manufacturing process, braiding manufacturing process and others.

In an embodiment, the carrier body 20 is a hollow tube, such as a vehicle transmission body, the opposite two ends thereof 20a, 20b are used to be externally connected to other components, such as vehicle accessories. For instance, the plurality of guide pins 21 is distributed on the surfaces 20c of the opposite ends 20a and 20b of the carrier body 20.

Moreover, the guide pin 21 is disposed on the surface 20c of the carrier body 20 in a detachable manner, as shown in FIG. 2B. For instance, a plurality of bases 22 is disposed on the surface 20c of the carrier body 20, so the guide pin 21 is engaged to the base 22 (as the sleeve hole 210 of the guide pin 21 is socketed on the protrusion 220 of the base 22 shown in FIG. 2C).

Additionally, the guide pin 21 can rotate relatively to the carrier body 20, as the self-rotation direction R shown in FIG. 2B, to guide the wires 9 be woven on the surface 20c of the carrier body 20. For instance, the sleeve hole 210 and/or the base 22 is either circular. So, when the wires 9 contact the guide pin 21, the guide pin 21 will rotate to conveniently bring the wires 9 to the carrier body 20 superior. It should be understood that the guide pin 21 is passively rotating. While in other embodiments, the guide pin 21 can be rotated automatically by a power source (such as a motor) that is without special limitation.

Besides, as shown in FIG. 1A, in an embodiment, one end 20a of the carrier body 20 is engaged to a robot arm 3, so the robot arm 3 displaces the carrier body 20. The carrier body 20 can pass through the ring body 100 along the arrow direction X, that is, opposite two ends 20a, 20b of the carrier body 20 are respectively located on opposite sides of the ring surface of the ring body 100. For instance, the robot arm 3 drives the carrier body 20 to move along the displacement direction F (i.e., the direction parallel to the arrow direction X), so that the wires 9 gradually cover the carrier body 20 to adjust and control the wrapping area and firmness for covering the carrier body 20 by the wires 9.

Figure 3A:
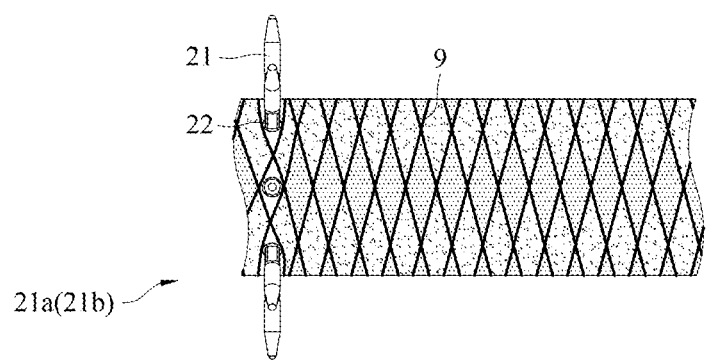
FIG. 3A is a schematic partial perspective view of a processing equipment in the processing process of the present disclosure.
Figure 3B:
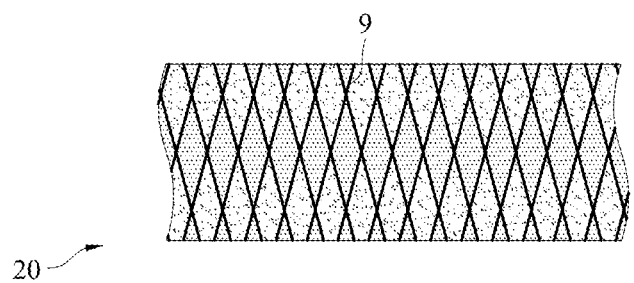
FIG. 3B is a schematic partial planar view of a processing equipment in the processing process of the present disclosure.
Figure 3C:
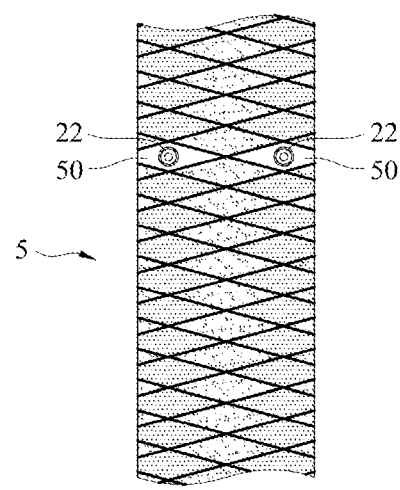
FIG. 3C is a schematic planar view of an object manufactured by a processing equipment in the present disclosure.

In an embodiment, in the operation of the processing equipment 1, one end 20a of the carrier body 20 is firstly engaged to the robot arm 3, so the robot arm 3 pushes another end 20b of the carrier body 20 toward the ring center area A of the ring body 100 along the arrow direction X. And then, the wire supply device 11 pulls the wire 9 from the ring body 100 toward the ring center area A to the surface 20c of the carrier body 20. Then rotate each of the base 110 to displace each of the wire supply device 11, so that wire 9 on each of the wire supply device 11 can be woven interlaced on the surface 20c of the carrier body 20. Meanwhile, the robot arm 3 continues to push the second end 20b of the carrier body 20, so that the second end 20b passes through the ring body 100. Afterwards, after the wire 9 covers the first end 20a of the carrier body 20, as shown in FIGS. 3A to 3B, remove the guide pin 21 to form a plurality of exposed areas 50, as shown in FIG. 3C, so as to obtain a target 5 (for example, a vehicle carbon fiber transmission shaft that can transfer torque through contacts).

It should be understood that, in the weaving process, the carrier body 20 only moves linearly along the arrow direction X without rotating to stably weave the wire 9. However, in other embodiments, the carrier body 20 can be rotated as required.

Therefore, the processing equipment 1 of the present disclosure mainly has the design of the guide pin 21 on the carrier structure 2, so when the wire 9 is woven on the carrier body 20, the wire 9 can flash over the guide pin 21 to form an exposed area 50. Hence, as compared to the prior art, if the guide pin 21 is disposed on the position of the transmission key of the vehicle transmission shaft, the wire 9 can keep the transmission key away to conveniently form an exposed area 50 as a hole-shape. That not only a more powerful load specification can be provided by the transmission key, but also does not damage the wire 9 and reduce the structural strength of the target 5, so as to improve the product reliability of the target 5.

Besides, the guide pin 21 is disposed on the surface 20c of the carrier body 20 in a detachable manner. Hence, the carrier structure 2 can arrange the guide pin 21 according to the position of the transmission key, and this makes the design of the target 5 more flexible and more widely used.

Furthermore, by means of disposing a plurality of wire supply devices 11 on the ring body 100 in a displaceable manner, the wires 9 are provided onto the carrier structure 2 so as to cover the carrier structure 2. Hence, as compared to the prior art, the processing equipment 1 of the present disclosure can weave carbon fiber wires 9 directly on the carrier structure 2 without adhesive material or performing drilling. So, problems such as carbon fiber wires 9 peeling off or structural damages can be avoided as to ensure that the overall structural strength of the target 5 made of the carbon fiber wires 9 and the carrier structure 2 meets the requirements.

In addition, in another embodiment, the processing equipment 1 adopts the method of weaving to manufacture a target 5 including carbon fiber material, so that the mechanical contact strength between the carrier structure 2 and the wire 9 is much stronger than the adhesive strength of the adhesive material. Hence, as compared to the prior art, the carbon fiber vehicle transmission shaft woven by the processing equipment 1 of the present disclosure can provide a much more powerful load specification.

As can be seen from the above, the processing equipment 1 and the carrier structure 2 thereof of the present disclosure are mainly provided the plurality of wire supply devices 11 on the ring body 100 along the ring body 100 in a displacement manner. The wire 9 is provided to the carrier structure 2 so as to cover the carrier structure 2. Hence, as compared to the prior art, the processing equipment 1 of the present disclosure can have carbon fiber wire 9 directly weaved on the carrier structure 2 without adhesive material or performing drilling, so problems such as carbon fiber wires 9 peeling off or structural damage can be avoided, so as to ensure that the overall structural strength of the vehicle transmission shaft made of the carbon fiber wires 9 and the carrier structure 2 meets the requirements.

Moreover, by means that the carrier structure 2 has the design of the guide pin 21, when weaving wire 9 on the carrier body 20, the wire 9 can keep the guide pin 21 away to form an exposed area 50. Therefore, when the guide pin 21 is disposed on the position of the transmission key of the vehicle transmission shaft, the wire 9 can keep the transmission key away to conveniently form an exposed area 50 as a hole-shape, such that the strength of the carbon fiber wire 9 will not be damaged, so as to improve the strength and reliability of the vehicle transmission shaft.

Additionally, the processing equipment 1 adopts the method of weaving to manufacture a target 5 including carbon fiber material, so that the mechanical contact strength between the carrier structure 2 and the wire 9 is much stronger than the adhesive strength of the adhesive material. Hence, as compared to the prior art, the carbon fiber vehicle transmission shaft woven by the processing equipment 1 can provide a much more powerful load specification.

To sum up, in the processing equipment and the carrier structure thereof of the present disclosure, it is mainly by means that the guide pin is disposed on a carrier body of the carrier structure, so the wire can keep the guide pin away to form an exposed area on the carrier body. Hence, it can not only avoid problems of reducing the structural strength of a target due to the structure of the wire being damaged but also make applications of the target more widely (such as providing the vehicle transmission shaft with different torque requirements).

The above embodiments are set forth to illustrate the principles of the present disclosure and the effects thereof, and should not be interpreted as limiting the present disclosure. The above embodiments can be modified by one of ordinary skill in the art without departing from the scope of the present disclosure as defined in the appended claims. Therefore, the scope of protection of the right of the present disclosure should be listed as the following appended claims.

What is claimed is:

1. A carrier structure, adapted to woven wire-supply, the carrier structure comprises:
   a carrier body;
   at least a guide pin disposed on a surface of the carrier body, so wires are woven around the at least a guide pin and covered on the carrier body, wherein the at least a guide pin rotates relative to the carrier body; and
   a base engaged to the at least a guide pin and disposed on the surface of the carrier body, wherein a sleeve hole of the guide pin is socketed on a protrusion of the base.

2. The carrier structure of claim 1, wherein the at least a guide pin is disposed on the surface of the carrier body in a detachable manner.

3. A processing equipment, comprising:
   a frame having a ring body;
   a carrier structure having a carrier body and at least a guide pin, the at least a guide pin is disposed on a surface of the carrier body, so wires are woven around the at least a guide pin and covered on the carrier body, and the carrier structure is correspondingly disposed in a ring center area of the ring body, so that the at least a guide pin of the carrier body rotates relative to the carrier body; and
   a plurality of wire supply devices disposed on the ring body in a displaceable manner, and the wires are gathered by winding, so the wires are supplied to the carrier structure from the plurality of wire supply devices, so that the wires match the movements of the plurality of the wire supply devices to be woven on the carrier structure.

4. The processing equipment of claim 3, wherein the plurality of wire supply devices includes a plurality of sticks or rods for winding and concentrating the wires.

5. The processing equipment of claim 3, wherein the plurality of wire supply devices is displaced on the ring body by a track structure disposed on the ring body.

6. The processing equipment of claim 5, wherein the track structure comprises a plurality of base bodies arranged continuously along the ring body, and the plurality of base bodies is disposed on the ring body in a manner that can self-rotate relative to the ring body.

7. The processing equipment of claim 6, wherein a gear structure is disposed on an edge of the plurality of the base bodies, so adjacent two of the plurality of base bodies mesh with each other, so that each of the base bodies can rotate synchronously, such that when each of the base bodies rotating, the plurality of wire supply devices can displace from one of the plurality of base bodies to the other adjacent one of the plurality of the base bodies.

8. The processing equipment of claim 3, wherein one end of the carrier body is engaged to a robot arm, so the robot arm disposes the carrier structure in the ring center area of the ring body and displaces the carrier body.

9. The processing equipment of claim 3, wherein the at least a guide pin of the carrier body is disposed on the surface of the carrier body in a detachable manner.

10. The processing equipment of claim 3, wherein a base engaged to the at least a guide pin is disposed on the surface of the carrier body.

\* \* \* \* \*